United States Patent [19]

Doering

[11] Patent Number: 4,868,912
[45] Date of Patent: Sep. 19, 1989

[54] INFRARED TOUCH PANEL

[75] Inventor: Roger W. Doering, Hayward, Calif.

[73] Assignee: Digital Electronics, Hayward, Calif.

[21] Appl. No.: 225,272

[22] Filed: Jul. 28, 1988

Related U.S. Application Data

[63] Continuation-in-part of Ser. No. 935,471, Nov. 26, 1987, abandoned.

[51] Int. Cl.$^4$ .............................................. G08C 21/00
[52] U.S. Cl. ................................... 340/706; 250/221; 250/553
[58] Field of Search ................ 340/711, 706; 250/553, 250/221, 224

[56] References Cited

U.S. PATENT DOCUMENTS 4,645,920 2/1987 Carroll et al. ...................... 250/221

Primary Examiner—Stafford D. Schreyer
Attorney, Agent, or Firm—Flehr, Hohbach, Test, Albritton & Herbert

[57] ABSTRACT

A touch panel system having enhanced touch detection which distinguishes between deliberate actuations of the touch system and accidental and other false actuations. The system has a display surface surrounded by a multiplicity of light emitting elements and light receiving elements that define a grid of intersecting light paths. The display surface is scanned by sequentially enabling selected pairs of the light emitting and light receiving elements. False actuation rejection involves the use of one or more of three techniques: ignoring touches which fail to block a minimum number of contiguous beams in both axes, ignoring touches which block in excess of a specified maximum number of contiguous beams in either axis, and ignoring touches which are of a duration of less than a minimum specified time. The minimum and maximum size constraints on the size of the object touching the screen, and the minimum contact time are programmable. These criteria enable the system to distinguish many types of false hits or accidental touchings of the screen from deliberate touchings by a person selecting an item on the touch panel. An additional feature of the present invention is beam fault tolerance. Whenever a beam component fails, the system can determine exactly which beam element has failed, and can mask out that beam from all future determinations of whether a user selection is being made by touching the screen.

15 Claims, 2 Drawing Sheets

INFRARED TOUCH PANEL

This application is a continuation-in-part of patent application Ser. No. 06/935,471, filed Nov. 26, 1987, now abandoned entitled TOUCH PANEL USING MODULATED LIGHT, in the name of Roger W. Doering and Colin F. McManus. A portion of the disclosure of this patent document contains materials to which a claim of copyright protection is made. The copyright owner has no objection to the facsimile reproduction by anyone of the patent document or the patent disclosure, but reserves all other rights whatsoever.

The present invention relates generally to touch sensitive screens displays and panels, and particularly to a touch panel apparatus and method which is fault tolerant and which can distinguish between a valid selection event, such as a finger touching a selected location on the screen, and extraneous objects coming into contact with the screen.

BACKGROUND OF THE INVENTION

Touch sensitive panels and screens are commonly used in many types of computerized equipment. In some systems, a touch screen avoids the need for providing a keyboard.

Referring to FIG. 1, a touch screen is typically used to allow the user to easily select one of a plurality of displayed items. The user makes his or her selection by touching the portion of the screen associated with the item to be selected. To clarify the boundaries of the areas associated with each item, the image on the screen may include boxes surrounding the displayed items.

The uses of touch screens have grown increasingly sophisticated, allowing the user to draw pictures, manipulate menus, use a displayed keyboard for alphanumeric input, and so on.

The terms "screen", "display", and "panel" are used synonymously herein. The present invention concerns the touch aspect of touch screens. Therefore, for this purpose it is unimportant how the image on the touch sensitive apparatus is displayed. The touch mechanism could even be used with a static image instead of with a display device.

In most cases, the term "touch sensitive" is a misnomer. Most touch sensitive screens, including the present invention, sense the interruption of one or more light beams; they do not sense actual physical contact with the screen or panel. The display is surrounded by pairs of light emitting and light sensing elements, such as infrared light emitting diodes. These pairs are individually enabled in a preselected pattern, and the position of any object (such as the user's finger) touching the screen is determined by looking at which lights are blocked by the object. For this reason the phrases "touching the display" and "adjacent to the display" are used synonymously herein.

A serious shortcoming in prior art touch screens is that the prior art screens cannot distinguish between a person deliberately touching the screen with one pointed finger and accidental or inadvertent touchings or actuations of the screen—such as by an insect landing on the screen, a wad of paper bouncing against the screen, a box or document being pushed up against the screen, or even a person accidentally brushing up against the screen. This is a particularly significant problem for horizontally oriented screens, because it is easy for an object (e.g., a pencil or a book or a memorandum) to fall onto a horizontal screen.

Another significant problem in prior art touch screens is that the prior art screens are totally disabled when a single beam element (i.e., a light beam emitter or a light beam detector) fails. This is because a component failure looks the same as a beam blocked by a person's finger: both result in the failure to detect a particular beam going across the screen.

Both of these problems with prior art touch screens have made touch screen more prone to failure than other computer interfaces, and have therefore limited the range of applications in which touch screens are used.

It is therefore a primary object of the present invention to provide solutions to both of the above identified problems. As a result, the present invention provides a fault tolerant touch screen which continues to operate even after one or more beam components have failed. The touch screen of the present invention is also able to distinguish between deliberate user selections and accidental or inadvertent touchings of the screen.

SUMMARY OF THE INVENTION

In summary, the present invention is a touch panel system having a "touch sensitive" display surface with a defined perimeter. Surrounding the display surface are a multiplicity of light emitting elements and light receiving elements. These elements are located so that the light paths defined by selected pairs of light emitting and light receiving elements cross the display surface and define a grid of intersecting light paths.

The touch panel system includes software for distinguishing between deliberate and accidental touchings of the touch panel, sometimes called false hits. In particular, false hit rejection involves the use of one or more of a set of three techniques: ignoring touches which fail to block a minimum number of contiguous beams in both axes, ignoring touches which block in excess of a specified maximum number of contiguous beams in either axis, and ignoring touches which are of a duration of less than a minimum specified time. Thus the present invention includes programmable minimum and maximum size constraints on the size of the object touching the screen, as well as a programmable minimum contact time requirement. These criteria enable the system to distinguish many types of false hits or accidental touchings of the screen from deliberate touchings by a person selecting an item on the touch panel. Different ones and combinations of these criteria can be used to provide false hit rejection for a wide variety of working environments.

An additional feature of the present invention is beam fault tolerance. Whenever a beam component fails, the system can determine exactly which beam element has failed, and can mask out that beam from all future determinations of whether a user selection is being made by touching the screen.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Basic Operation of Touch Sensitive Display

Figure 1:
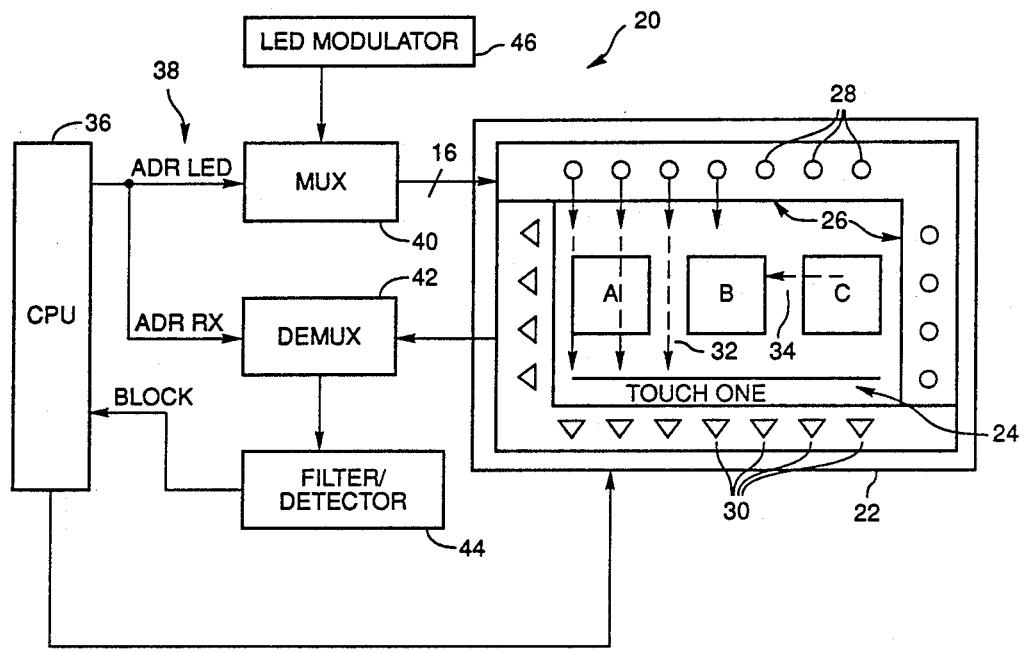
FIG. 1 is a block diagram of a touch screen system in accordance with the present invention.

Referring to FIG. 1, there is shown a touch screen display system 20 having a display 22 is "touch sensitive". The display 22 has a display surface 24 with a defined perimeter.

Surrounding the display surface 24 are a multiplicity of light emitting elements (LEDs) 28 and light receiving elements (phototransistors) 30. These LED and phototransistor elements are located so that the light paths 32 and 34 defined by selected pairs of LEDs and phototransistors cross the display surface 24 and define a grid of intersecting light paths. For a rectangular display such as the one shown in FIG. 1, each LED 28 is matched by or paired with phototransistor 30 horizontally or vertically across the display surface.

The light emitting elements used in touch screens are typically infrared LEDs (light emitting diodes), although other light frequencies and components could be used.

A computer 36, in conjunction with a scanning circuit 38, determines if an object is touching or adjacent to the display surface 24 by sequentially enabling each of the LEDs 28 surrounding the display surface 24 and looking to see if the corresponding phototransistors 30 receive the light transmitted by the LED 28. If the light is received, it can be concluded that no object is blocking the light path defined by the LED 28 and its corresponding phototransistor 30. On the other hand, it can be concluded that an object is blocking the light path if the emitted light is not received.

By sequentially enabling or energizing all of the LEDs and looking at the resulting BLOCK signal, the computer 36 can determine the location of any object which is adjacent to (i.e., touching or almost touching) the display surface. At the risk of belaboring the obvious, if two or more intersecting light paths are being blocked by an object, the location of the object is the intersection of the blocked vertical and horizontal light paths.

In the preferred embodiment, there are approximately five LEDs and phototransistors per inch around the perimeter 26 of the display surface 24. Most touch screens will use between three and six elements per inch. In the preferred embodiment there are fifty-six LED and phototransistor pairs surrounding the display. The scanning circuit 38 is designed to handle up to sixty-four pairs. Due to the close spacing of elements, it is unusual for only one or more light paths on a single axis to be blocked without an intersecting light path also being blocked; but if this happens the computer 36 will not be able to locate the object blocking the light beam(s). For instance, a piece of paper could be used to block several vertical light paths without blocking any of the horizontal light paths. In practice, however, it is actually quite difficult to block the beams on one axis without block at least one beam in the other axis due to the small separation between adjacent beams.

In normal operation, the computer 36 addresses each LED/phototransistor pair with a single six bit address AdrLED. The scanning circuit 38 uses a multiplexer 40 to decode the address AdrLED and thereby energizes one of the fifty-six LEDs 28 along the top and right hand side of the display surface 24. A demultiplexer 42 also decodes the address AdrLED and enables just one of the fifty-six phototransistors 30 along the display's perimeter 26 to be coupled to a filter/detector circuit 44.

The filter/detector circuit 44 determines whether the selected phototransistor is receiving light from the selected LED and, if not, generates a blocked path signal BLOCK.

To solve the problems associated with using touch screens in bright ambient light conditions, the amplitude of the light emitted by the selected LED is modulated in accordance with a predetermined pattern. In the preferred embodiment, the LED is driven by a sinusoidally varying current generated by an LED modulator circuit 46.

In the preferred embodiment, the LED's amplitude is modulated at a frequency of 60 kilohertz. The inventor has found that modulation frequencies between 10 kilohertz and 500 kilohertz are effective in most ambient light conditions and are therefore preferred. High modulation frequencies are preferred because they permit faster testing for blocked light paths, and therefore faster scanning of the entire display and faster response to actions by the user of the system 20. With currently available low cost phototransistors, the maximum feasible modulation frequency is approximately 1 megahertz. Phototransistors generate output signals which correspond (and, in fact, are approximately proportional) to the amplitude of the light received by the phototransistor. The filter circuit 44 generates a blocked path signal if the currently enabled phototransistor is not generating an output signal modulated in the same way (i.e., in the preferred embodiment, at the same frequency) that the LED's amplitude is modulated. In other words, as long as a portion of the light received by the phototransistor is modulated at the same frequency as the currently enabled LED, then the system concludes that the currently enabled light path is not blocked.

Figure 2:
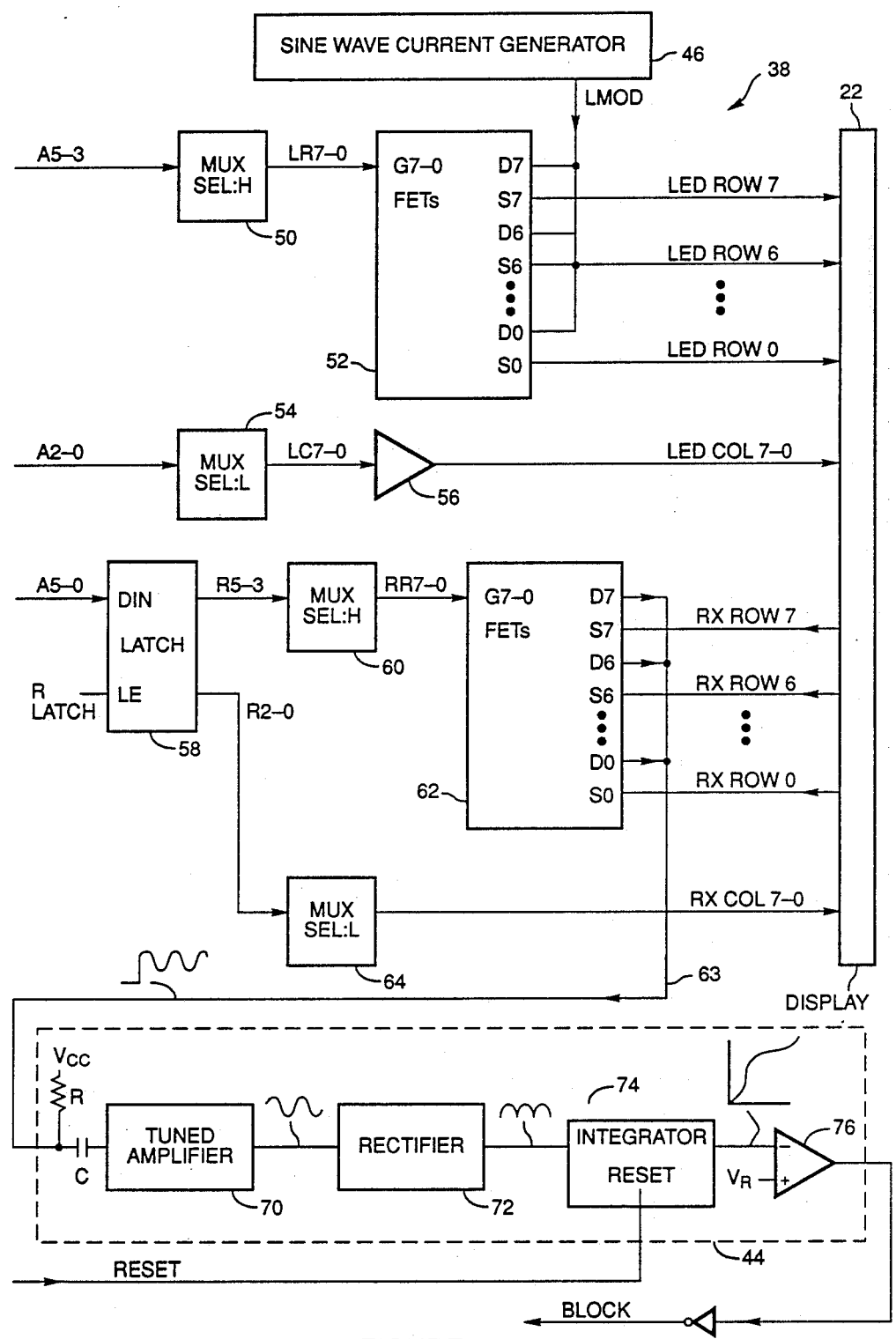
FIG. 2 is a block diagram of the multiplexing and signal modulation circuitry used in the preferred embodiment.

FIG. 2 is a block diagram of the scanning circuit 38 used in the preferred embodiment. The signal lines on the left side of this figure go to the computer 36 shown in FIG. 1. As will be understood by those skilled in the art, the computer 36 is a one chip microcomputer which includes an interface circuit for buffering the flow of signals in and out of the microcomputer.

Address lines A5–A0 from the computer 36 are used to select both the LED and the phototransistor to be energized. Since six binary address lines are used, up to 64 separate LED/phototransistor pairs can be addressed. By using a latch signal, RLatch, the computer can select a phototransistor with an address that is different than the currently selected LED. Normally, though, the selected LED and phototransistor will have the same address.

Referring back to FIG. 2, the LED currently selected by the computer is energized as follows. Address lines A5–A3 are decoded by a multiplexer 50 so that only one of the lines LR7–LR0 are pulled high. These lines LR7–LR0 are coupled to the gates of eight FETs (field effect transistors) 52, thereby enabling only one of the FETs. The output of a sine wave current signal generator 46 is coupled to the drains of all eight FETs 52, and the sources of the FETs are coupled to LED drive lines LEDRow7–LEDRow0. Thus, one of the LED drive lines is driven by the sine wave signal from generator 46, and all of the other drive lines are left floating (i.e., isolated by the FETs). Address lines A2-A0 are decoded by multiplexer 54 which pulls one of the resulting eight lines LC7-LC0 low and leaves the others at a high voltage (i.c., Vcc, which is 5 volts). The current capacity of these lines is amplified by buffer 56, so that one of the lines LEDCol7-LEDCol0 is pulled low and absorbs the current flowing through the selected LED.

The circuit for selecting one phototransistor is similar to the circuit for selecting one LED, except that Latch 58 can latch the address used to select the phototransistor. When the RLatch signal from the computer 36 is high, the Latch 58 is transparent—the address signals flow unimpeded from lines A5-A0 to lines R5-R0. However, when RLatch is low, the present state of the A5-A0 lines is latched and held on lines R5-R0 until RLatch is pulled high.

Multiplexer 60 decodes address lines R5-R3 and pulls one of the eight lines RR7-RR0 high. These lines RR7-RR0 are coupled to the gates of eight FETs (field effect transistors) 62, thereby enabling only one of the FETs. The sources of the FETs are coupled to phototransistor collector lines RxRow7-RxRow0, and the drains are all coupled to the input of the filter detector circuit 44. Thus, one of the phototransistor collector lines is coupled to connector line 63, and all of the other drive lines are left floating (i.e., isolated by the FETs).

Address lines R2-R0 are decoded by multiplexer 64 which pulls one of the resulting eight lines RxCol7-RxCol0 low and leaves the others at a high voltage (i.c., Vcc, which is 5 volts). The selected line RxCol7-RxCol0 which is pulled low absorbs the current flowing through the selected phototransistor.

The selected phototransistor gets its current from the power supply node Vcc through a resistor R in the filter 44. This resistor R will typically have a low resistance, typically between 50 and 100 ohms.

Phototransistors draw current corresponding to the amplitude of the light received. Thus if the light received by the selected phototransistor consists of a d.c. component from the ambient light surrounding the display 22 plus a pulsing or modulated light from the LED across the display, the phototransistor's current will have both a d.c. and an a.c. component—as schematically shown above line 63. Further, the a.c. component will vary at the same frequency as the frequency that the incoming light is modulated.

Note that the current source for the phototransistor is given a low resistance so that the phototransistor will draw a readily detectable a.c. current even in bright ambient light conditions.

The resulting voltage on line 63 is sensed and analyzed by the filter circuit 44. The signal on line 63 is a.c. coupled through capacitor C to a tuned amplifier 70. Amplifier 70 is a narrow band amplifier which selectively amplifies signals at the frequency generated by the sine wave generator 46. Thus, to the extent that the voltage on line 63 varies at 60 kilohertz (the modulation frequency output by generator 46) the tuned amplifier 70 will generate a sinusoidal output signal. If the light from the selected LED is blocked by an object touching the display surface 24, then the output of the amplifier 70 will be a flat grounded signal.

After passing the output of amplifier 70 through a rectifier 72, this signal is integrated by an integrator circuit 74. If the received light includes the light from the enabled LED, the output of the integrator 74 will rise; otherwise it will generate a flat output. Then the output of the integrator is compared by comparator 76 with a reference signal $V_R$ (having a voltage of approximately one volt in the preferred embodiment) to determine if the received light includes the light from the enabled LED. If so, the output of the comparator is high; otherwise it is low, indicating that the light path defined by the selected LED/phototransistor pair is blocked. The BLOCK signal shown in FIG. 1 is generated by inverting the output of the comparator 76.

The integrator 74 needs to be reset each time that a new LED/phototransistor pair is enabled. In an alternate embodiment, the integrator 74 could be replaced a low pass filter. The low pass filter would pass a null signal if the output of the tuned amplifier 70 is null, and would pass a positive signal if the tuned amplifier 70 generates a sinusoidal output. The low pass filter has the disadvantage of being somewhat slow, but has the advantage that it need not be reset.

Additional details regarding the basic operation of the touch screen's circuitry is disclosed in patent application serial no. 06/935/,461, filed Nov. 26, 1987 entitled TOUCH PANEL USING MODULATED LIGHT, in the name of Roger W. Doering and Colin F. McManus, hereby incorporated by reference.

Basic Touch Screen Cycle

Before presenting the improved touch detection software used in the present invention, a more basic touch detection technique is described.

The computer 36 is programmed to process the BLOCK signals generated by the touch screen apparatus described above so as to determine whether an object is "touching" the screen, and the location of that object. Whenever an object is found to be touching the screen, the software which controls this process, herein called the touch detection software, issues a report denoting the location of that object. Examples of this software are presented in Tables 1-3 and are described below.

In practical applications, the object location reports generated by the touch detection software are usually read by an application program which uses this information to determine which item on the screen that the user has selected. Typically, the application program is be the primary task running in the computer 36, and the touch detection software is a interrupt routine which runs a certain number of times per second, once each time that an LED is turned on as the screen is continuously scanned. Thus the touch detection software typically runs in "the background" as a utility which enables application programs to work with touch screen user interfaces.

The repetition rate of the touch detection software is generally controlled by a timer or clock associated with the computer 36, and will vary depending on the number of LEDs surrounding the screen and the rate at which the screen is scanned. For instance, if there are fifty-six LEDs 28 along the periphery of the screen 24, and the screen is scanned fifteen times per second, the touch detection software routine is run 840 times per second. In other applications, the repetition rate may be as high as several thousand times per second.

Tables 1-3 contain listings of touch detection software, written using a high level "pseudocode" language that can be easily understood by anyone skilled in the art of computer programming. Portions of these routines are herein referenced by the line numbers along the left margin of the tables.

Table 1 shows a very basic touch detection routine. This routine processes the BLOCK signals generated by the computer 36 and generates a report whenever it finds that at least one horizontal and one vertical beam are blocked.

More particularly, under the control of this routine, the computer 36 checks for an object touching the display surface 24 by sequentially enabling all of the LED/phototransistor pairs around the display and testing the BLOCK signal. If a blocked path is detected (see line 5), the system checks to make sure that all the blocked paths are contiguous, because if more than one object is touching the screen it will often be impossible to determine the position of both objects.

At the end of each complete scan of the screen, the routine generates a report (see lines 33-34) denoting the range of horizontal and vertical paths which were found to be blocked. If noncontiguous blocked paths are detected, that is indicated in the report generated by the routine (see lines 14 and 25). The information in these reports can be used by other routines running in the computer 36 to determine what action the user is requesting.

Locating Failed Components

Table 2 shows a routine that determines the location of failed components. This routine is typically called by other touch detection routines when those routines detect that one or more of the LED/phototransistor pairs around the display always appears to be blocked. In addition, this routine is typically called each time that the power for the display is turned on, or that the system is reset. However, this routine could also be called by the user of the system whenever the user suspects that the touch screen is not operating properly.

It may be noted that the routine in Table 3, discussed below, which calls the fault checking routine in Table 2, assumes that beam component failures occur randomly over time, and that the beam components for two intersecting beams will not fail simultaneously. If the components for two intersecting beams were to fail simultaneously, the failed beams would look like an object touching the screen, and therefore touch detection routine in Table 3 would not call the fault checking routine. Due to the extremely low failure rate of beam components, it is believed that the possibility of this happening is extremely remote.

Generally, if an LED/phototransistor pair is consistently generating a blocked path signal, even when no other pairs are blocked, this means either that piece of paper or a similarly thin object is touching the screen 24, or that an LED or phototransistor is malfunctioning. The routine in Table 2 determines whether the LED or the phototransistor from that pair are malfunctioning.

In the preferred embodiment, the computer 36 under the control of this routine first generates a display which asks the user to make sure that nothing is touching the screen 24 (see lines 1-2). After a suitable delay, the routine then proceeds to enable each LED/phototransistor pair and check to see if a blocked path signal BLOCK is generated (see lines 5-7).

An array called BAD_BEAM is used to keep track of which beam pairs contain failed components. The array contains one entry for each light path. As each LED/phototransistor pair is checked, if the beam is not blocked, the corresponding entry in BAD_BEAM is marked "False"—indicating that this light path does not have failed components.

When a blocked pair is found (see line 7), the corresponding entry in BAD_BEAM is marked "True", and the Check subroutine (lines 18-37) is called. This subroutine uses the RLatch signal shown in FIG. 2 to separately enable each of the elements in the blocked pair while using a different complementary component on the other side of the screen. More particularly, first it enables the phototransistor in the blocked pair while enabling an LED near the pair's LED (i.e., near the LED normally corresponding to the selected phototransistor) (see line 25), and then it enables the LED in the blocked pair while enabling a phototransistor near the selected phototransistor (i.e., the phototransistor normally corresponding to the selected LED). If the system still generates a blocked path signal when the alternate LED is enabled, then the routine reports that selected phototransistor is malfunctioning because it much more likely that one phototransistor isn't working than that two LEDs have failed. Similarly, if the system generates a blocked path signal when the alternate phototransistor is enabled, then the routine reports that the selected LED has failed.

Enhanced Touch Detection Routine

The touch detection routine shown in Table 3 is an enhanced version of the routine shown in Table 1. Lines 1-36 of the enhanced routine are the same as the routine in Table 1, except for provisions (lines 9, 15, 22 and 28) for ignoring paths known to have failed components. All other aspects of the routine in Table 3 are new. In particular, at the completion of each complete scan of the screen, the enhance routine analyzes the blocked path signal data collected during the scan. The analyses performed are discussed below.

The touch detection routine shown in Table 3 includes the ability to compare the size of an object touching the screen with specified minimum and maximum size criteria, and for rejecting touches by objects outsize the specified criteria (see lines 91-101). These size criteria help to distinguish between human fingers touching the screen and accidental touchings by books, pieces of paper, pencils placed on horizontal screens, flies landing on the screen, and so on.

In the preferred embodiment, the size criteria are minimum and maximum numbers ($MIN_{13}$ SIZE and MAX_SIZE) of contiguous beams (i.e., light paths) that must be blocked in order for the object touching the screen to be "accepted" — i.e., reported by the routine. For example, a typical display has between approximately four and six beams per inch. Thus the spacing between beams is typically between 0.25 and 0.16 inches. Given that a typical human finger is about a half inch in diameter, reasonable MIN_SIZE and MAX_SIZE criteria for filtering out unreasonably large and small objects are MIN_SIZE=2 and MAX_SIZE=4 to 6.

The minimum and maximum size criteria address distinct types of false hits. The minimum size restriction prevents actuation by such things as an insect landing on the touch panel or a pencil pointing at the screen, while the maximum size restriction prevents actuation by a pencil laying on the screen or a person brushing against it. In alternate embodiments of the invention, distinct minimum and maximum size criteria could be provided for the horizonal and vertical axes.

The enhanced touch detection routine also requires that an object touch the screen for a specified amount of time (i.e., a specified number of scan cycles, SCAN_LI- MIT) before acknowledging that the screen has been touched (see lines 104–110). This capability prevents objects bouncing off the screen from being treated as input by a user of the system. This criteria typically requires that the user touch the screen (i.e., block the screen's beams) for a period of time consistent with deliberately selecting an item on the screen. This period of time typically ranges from 0.10 to 0.25 seconds, with values between 0.15 and 0.20 seconds being the most commonly used. Since unit of time used for this criteria is "scan cycles", this degree to which this criteria can be fine tuned depends on the rate at which the screen is scanned.

Finally, this enhanced touch detection routine is fault tolerant. In particular, the routine ignores light paths known to have failed components (see lines 9, 15, 22, 28). It also determines when a component failure is likely to have occurred and calls the BAD_BEAM_CHECK routine of Table 2 when it appears that there is a "bad beam". The criteria for calling the BAD_BEAM_CHECK routine are (1) that a blocked beam, other than a known "bad beam", is detected without there being any intersecting blocked beams (see lines 64 and 72), and (2) that this same pattern of blocked and unblocked beams continues for at least a predefined number of scan cycles (see lines 73–87). The predefined number, labelled SUSPECT_SCAN_LIMIT in Table 3, typically has a value equal the number of scan cycles during a predefined period of time somewhere between 5 and 20 seconds, and generally should be large enough to ensure that a momentary path blockage does not trigger a call to the BAD_BEAM_CHECK routine.

Typically, when an LED or phototransistor fails, only one new element will fail at any time. The newly failed component will cause the generation of a blocked path signal for the corresponding light path. When no object is touching the screen, there will be only path that is "blocked" and there will no intersecting blocked path. The enhanced touch detection routine in Table 3 detects the newly failed component by detecting this pattern, and calls the BAD_BEAM_CHECK routine to update the BAD_BEAM array.

As explained above with reference to Table 2, the BAD_BEAM_CHECK routine tests all of the light paths for the display and updates entries in the BAD_BEAM array so that all light paths with a bad beam are marker "True" (i.e., bad) and all other light paths are marked "False" (i.e., not bad).

The enhanced touch detection routine in Table 3 has the additional feature that when a known bad beam is adjacent to a functional blocked beam, the bad beam is included in the block of adjacent beams, thereby allowing the object size restrictions discussed above to continue functioning even when there a failed components on the display (see lines 13–14 and 26–27). This incorporation of bad beams when adjacent to functional blocked beams also enables accurate reporting of the center location of the object touching the screen.

User Programming of Object Criteria

As shown at the end of Table 3, while the MIN_SIZE, MAX_SIZE, and SCAN_LIMIT parameters have default values, the user can reset the values of these parameters. The routine shown beginning at line 131 is a separate routine called by the user when customizing the characteristics of the touch screen apparatus. This ability to customize or reset these parameters can be used to disable selected ones of the enhanced features of the routine in Table 3. For instance, by setting SCAN_LIMIT to zero, the duration requirement is effectively masked or eliminated (see line 77). If MIN_SIZE is set equal to zero that eliminates the minimum size criteria for objects touching the screen, and if MAX_SIZE is set to a large value, such as 50, that will eliminate the maximum size criteria for objects touching the screen. Thus if any of the object criteria are inconsistent with the user's needs, those criteria can be turned off. In addition, if the user wants to make the criteria even more stringent, he can do so. For instance, the SCAN_LIMIT criteria could be increased to say 1.5 seconds (i.e., the number of scan cycles equivalent to 1.5 seconds) for applications where an inadvertent selection (e.g., in a nuclear power plant) might be disastrous.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, the geometric pattern of light emitting elements and light receiving elements could be changed in numerous ways. In some instances, especially nonrectangular displays, several light receiving elements could be paired with a single light emitting element, or vice versa.

Furthermore, there are clearly a large number of ways to implement software which will accomplish results similar to the routines in Tables 2 and 3. For instance, in some embodiments, distinct minimum and maximum size criteria could be provided for the horizonal and vertical axes. Other embodiments could use just one or two of the false hit rejection criteria provided by the preferred embodiment so as to reject only the false hits associated with particular work environments.

TABLE 1

Basic Touch Detection Routine

© Copyright 1987 Digital Electronics Corp.
All Rights Reserved.

-- Scan all horizontal and vertical light paths.
-- After each scan of all light paths, generate report
-- regarding location of blocked paths, if any.

```
                -- MAX_PATH = X + Y          total number of light paths
                -- MULTIPLE = 2 * MAX_PATH   used to report multiple hits
                -- Path#                     path being tested -- Interrupt Entry Point:
 1      Read BEAM_BLOCKED                    -- = .T. if Path is blocked
 2
 3      Turn on LED/Phototransistor((Path# Modulo MAX_PATH) + 1)
 4
 5      If BEAM_BLOCKED
 6          If Path# < X+1                   -- VERTICAL PATHS
 7              X_BEAM = Path#
 8              If LowX = 0                  -- first blocked column?
 9                  LowX = HighX = X_BEAM
10              Else                         -- test for contiguous
11                  If HighX = X_BEAM - 1    -- blocked paths
12                      HighX = X_BEAM
13                  Else                     -- noncontiguous
14                      HighX = MULTIPLE     -- blocked columns !
15                  Endif
16              Endif
17          Else                             -- HORIZONTAL PATHS
18              Y_BEAM = Path# - X
19              If LowY = 0                  -- first blocked row?
20                  LowY = HighY = Y_BEAM
21              Else                         -- test for continuous
22                  If HighY = Y_BEAM - 1    -- block paths
23                      HighY = Y_BEAM
24                  Else                     -- noncontiguous
25                      HighY = MULTIPLE     -- blocked rows !
26                  Endif
27              Endif
28          Endif
29      Endif
30
31      If Path# ≠ MAX_PATH
32          Path# = Path# + 1
33      Else               -- END OF ONE COMPLETE SCAN OF SCREEN
34          Report LowX, HighX, LowY, HighY
35          Path# = 1
36          LowX = HighX = LowY = HighY = 0   -- Reset for next scan
37      Endif
38
39      EXIT   -- Exit from routine after processing each path
```

TABLE 2

BAD BEAM CHECK Routine

© Copyright 1987 Digital Electronics Corp.
All Rights Reserved.

-- Detects Defective LEDs and Phototransistors

-- BAD_BEAM[1...MAX_PATH]    array for denoting failed
--                           components
-- Path#                     path being tested

```
1   Display "Please Make Sure Nothing Is Touching The Display"
2   Wait X seconds
3
4   Loop: For Path# = 1 to MAX_PATH
5       Turn on LED(Path#) and Phototransistor(Path#)
6       Read BEAM_BLOCKED
7       If BEAM_BLOCKED
8           BAD_BEAM[Path#] = True      -- mark bad beam path
9           Call Check(K)               -- determine whether LED
10                                      -- or phototransistor is
11                                      -- is defective
12      Else
13          BAD_BEAM[Path#] = False     -- mark good beam path
14      Endif
15  Endloop
16  Return
17
18  Subroutine Check:
19      Begin Case
20          Case (Path# = 1)    J=2
21          Case (Path# = X+1)  J=X+2
22          Otherwise           J=Path#-1
23      Endcase
24
25      Turn on LED(J) and Phototransistor(Path#)
26      Read BEAM_BLOCKED
27      If BEAM_BLOCKED
28          Report Bad Phototransistor Path#
29          Return
30      Endif
31
32      Turn on LED(Path#) and Phototransistor(J)
33      Read BEAM_BLOCKED
34      If BEAM_BLOCKED
35          Report Bad LED Path#
36          Return
37      Endif
38
```

TABLE 3

ENHANCED TOUCH DETECTION Routine

© Copyright 1987 Digital Electronics Corp.
All Rights Reserved.

```
-- MAX_PATH = X + Y            total number of light paths
-- OFFSCREEN = 0               null, offscreen X,Y position
-- MULTIPLE = 2 * MAX_PATH     used to report multiple hits
-- BAD_BEAM[1...MAX_PATH]      array for denoting failed
--                             components
-- Path#                       path being tested -- Interrupt Entry Point:
1   Read BEAM_BLOCKED                   -- = .T. if Path is blocked
2
3   Turn on LED/Phototransistor((Path# Modulo MAX_PATH) + 1)
4
```

```
 5     If BEAM_BLOCKED
 6         If Path# < X+1                          -- VERTICAL PATHS
 7             X_BEAM = Path#
 8             If LowX = 0                         -- first blocked column?
 9                 If .NOT. BAD_BEAM[Path#]        -- ck for bad beam
10                     LowX = HighX = X_BEAM
11                 Endif
12             Else                                -- test for contiguous
13                 If HighX = X_BEAM - 1           -- blocked paths
14                     HighX = X_BEAM
15                 ElseIf .NOT. BAD_BEAM[Path#]    -- ck for bad beam
16                     HighX = MULTIPLE            -- noncontiguous
17                 Endif                           -- blocked paths !
18             Endif
19         Else                                    -- HORIZONTAL PATHS
20             Y_BEAM = Path# - X
21             If LowY = 0                         -- first blocked row?
22                 If .NOT. BAD_BEAM[Path#]        -- ck for bad beam
23                     LowY = HighY = Y_BEAM
24                 Endif
25             Else                                -- test for continuous
26                 If HighY = Y_BEAM - 1           -- block paths
27                     HighY = Y_BEAM
28                 ElseIf .NOT. BAD_BEAM[Path#]    -- ck for bad beam
29                     HighY = MULTIPLE            -- noncontiguous
30                 Endif                           -- blocked rows !
31             Endif
32         Endif
33     Endif
34
35     If Path# ≠ MAX_PATH
36         Path# = Path# + 1
37         EXIT                                    -- Exit from routine after
38     Endif                                       -- processing each path
39
40     --   END OF ONE COMPLETE SCAN OF SCREEN
41     --   POST SCAN TOUCH DETECTION
42
43     -- SCAN_COUNT           Counter used to measure length of time
44     --                      that object is adjacent to display
45     -- SCAN_LIMIT           Minimum duration for acceptable touch
46
47     -- SUSPECT_SCAN_COUNT           Counter used to measure
48     --                              length of time that
49     --                              nonintersecting blocked path
50     --                              signals are received
51     -- SUSPECT_SCAN_LIMIT            Max number of scans with
52     --                              nonintersecting blocked path
53     --                              signals before recomputing
54     --                              positions of "bad beams"
55     -- LowSX, HighSX                Positions of suspected "bad
56     -- LowSY, HighSy                beams"
57
58     -- MAX_SIZE, MIN_SIZE           Size limits for acceptable
59     --                              objects touching the display
60
61     X_POSITION = LowX + HighX
62     Y_POSITION = LowY + HighY
63
```

```
 64    If X_POSITION = OFFSCREEN .and. Y_POSITION = OFFSCREEN
 65        SCAN_COUNT = 0
 66        SUSPECT_SCAN_COUNT = 0     -- no blocked beams found
 67        GOTO REPORT
 68    Endif
 69
 70
 71    -- Check for nonintersecting blocked beams
 72    If X_POSITION = OFFSCREEN .or. Y_POSITION = OFFSCREEN
 73        If LowX = LowSX .and. HighX = HighSX .and
 74           LowY = LowSY .and. HighY = HighSY
 75
 76            SUSPECT_SCAN_COUNT = SUSPECT_SCAN_COUNT + 1
 77            If SUSPECT_SCAN_COUNT > SUSPECT_SCAN_LIMIT
 78
 79                Call BAD_BEAM_CHECK    -- see Table 2
 80            Endif
 81        Else
 82            LowSX  = LowX
 83            HighSX = HighX
 84            LowSY  = LowY
 85            HighSY = HighY
 86            SUSPECT_SCAN_COUNT = 1
 87        Endif
 88        GOTO DONE   -- do not report nonintersecting blocked
 89                    -- beams
 90    Endif
 91    -- Filter out spurious touches
 92    -- by checking size of X and Y blockage
 93    X_SIZE = HighX - LowX
 94    Y_SIZE = HighY - LowY
 95
 96    If X_SIZE > MAX_SIZE  .or.  X_SIZE < MIN_SIZE  .or.
 97       Y_SIZE > MAX_SIZE  .or.  Y_SIZE < MIN_SIZE
 98
 99        GOTO DONE   -- do not report objects larger
100                    -- or smaller than limits
101    Endif
102
103
104    -- Make sure touch is of sufficient duration
105    SCAN_COUNT = SCAN_COUNT + 1
106    If SCAN_COUNT < SCAN_LIMIT
107
108        GOTO DONE   -- do not report touches of shorter
109                    -- duration than SCAN_LIMIT
110    Endif
111
112
113    -- Compare observed object/finger position with previously
114    -- reported position.  Report only new positions.
115    REPORT:
116    If X_POSITION ≠ X_REPORTED  .or.  Y_POSITION ≠ Y_REPORTED
117        X_REPORTED = X_POSITION
118        Y_REPORTED = Y_POSITION
119        Report X_REPORTED, Y_REPORTED
120    Endif
121
122
```

```
123     -- Reset Low/High markers and Path# before exiting
124     DONE:
125         LowX = HighX = LowY = HighY = 0  -- Reset for next scan
126         Path# = 1
127         EXIT   -- Exit from routine after processing full scan
128     RETURN
129
130
131     -- ROUTINE FOR SETTING VALID OBJECT CRITERIA --
132     Display:   Enter Values for the MAX_SIZE, MIN_SIZE
133                and SCAN_LIMIT parameters
134                Default values are:
135                    MIN_SIZE = 2
136                    MAX_SIZE = 5
137                    SCAN_LIMIT = 5
138     Read parameter values entered by user
139     RETURN
```

What is claimed is:

1. A touch panel comprising:

a display surface having a defined perimeter;

a multiplicity of light emitting elements and a multiplicity of light receiving elements; said elements located so that a multiplicity of light paths, defined by selected pairs of said light emitting and light receiving elements, cross said display surface and also intersect each other within the perimeter of said display surface;

beam blockage detection means, coupled to said light receiving elements, for generating a path blockage signal when the amount of light received by a selected light receiving element corresponds to a blocked light path; and computer means, coupled to said light emitting and light receiving elements and said beam blockage detection means, for controlling the operation of said touch panel, including scanning means for sequentially enabling selected pairs of said light emitting and light receiving elements;

and touch detection means, responsive to path blockage signals from said beam blockage detection means, for comparing said path blockage signals with predefined criteria which distinguish between a deliberate touching of said display surface and false or accidental touching of said display surface, and for generating an output signal indicative of the location of said object when said path blockage signals meet said predefined criteria.

2. A touch panel as set forth in claim 1, said touch detection means including means for comparing said path blockage signals from a plurality of scans of said display surface with predefined size and time duration criteria.

3. A touch panel as set forth in claim 1, said touch detection means including means for comparing said path blockage signals from a plurality of scans of said display surface with one or more criteria selected from the set consisting of: a minimum size criteria, a maximum criteria, and a minimum time duration criteria.

4. A touch panel as set forth in claim 1, including component failure detection means, including means for testing a selected light emitting element by performing the steps of enabling said selected light emitting element and a light receiving element across said display surface from said light emitting element, and testing for the presence of a blocking signal;

enabling the same light receiving element and a second light emitting element which is located near said selected light emitting element, and testing for the presence of a blocking signal; and denoting the detection of a component failure if a blocking signal is detected when said selected light emitting element is enabled, but no blocking signal is detected when said second light emitting element is enabled.

5. A touch panel comprising:

a display surface having a defined perimeter;

a multiplicity of light emitting elements and a multiplicity of light receiving elements; said elements located so that a multiplicity of light paths, defined by selected pairs of said light emitting and light receiving elements, cross said display surface and also intersect each other within the perimeter of said display surface;

beam blockage detection means, coupled to said light receiving elements, for generating a path blockage signal when the amount of light received by a selected light receiving element corresponds to a blocked light path; and computer means, coupled to said light emitting and light receiving elements and said beam blockage detection means, for controlling the operation of said touch panel, including scanning means for sequentially enabling selected pairs of said light emitting and light receiving elements;

and touch detection means, responsive to path blockage signals from said beam blockage detection means, for comparing said path blockage signals with predefined criteria corresponding to a deliberate touching of said display surface by a human finger or similarly sized object, and for generating an output signal indicative of the location of said object when said path blockage signals meet said predefined criteria.

6. A touch panel comprising:

a display surface having a defined perimeter;

a multiplicity of light emitting elements and a multiplicity of light receiving elements; said elements located so that a multiplicity of light paths, defined by selected pairs of said light emitting and light receiving elements, cross said display surface and also intersect each other within the perimeter of said display surface;

beam blockage detection means, coupled to said light receiving elements, for generating a path blockage signal when the amount of light received by a selected light receiving element corresponds to a blocked light path; and computer means, coupled to said light emitting and light receiving elements and said beam blockage detection means, for controlling the operation of said touch panel, including scanning means for sequentially enabling selected pairs of said light emitting and light receiving elements so as to repetitively scan said display surface;

failed component denoting means for denoting that specified ones of said pairs of said light emitting and light receiving elements are not functioning properly; and touch detection means, coupled to said failed component denoting means and responsive to path blockage signals from said beam blockage detection means, for determining whether an object is touching or adjacent to said display surface and for generating an output signal indicative of the location of an object touching or adjacent to said display surface when said path blockage signals correspond to intersecting block light paths;

said touch detection means including means for ignoring, when determining whether an object is touching or adjacent to said display surface, path blockage signals corresponding to pairs of said light emitting and light receiving elements denoted by said failed component denoting means as not functioning properly.

7. A touch panel as set forth in claim 6, including component failure detection means for detecting, during a plurality of consecutive scans of said display surface by said scanning means, the generation of a path block signal by said beam blockage detection means for at least a first one of said light paths and the absence of a path blockage signal for any light path intersecting said first one of said light paths.

8. A touch panel as set forth in claim 7, said component failure detection means including means for testing the operability of a selected one of said elements by performing the steps of:
enabling said selected element and a complementary element across said display surface from said selected element, and testing for the presence of a blocking signal;
enabling the same complementary element and a second element of the same type as said selected element and which is located near said selected element, and testing for the presence of a blocking signal; and
denoting the detection of a component failure if a blocking signal is detected when said selected element is enabled, but no blocking signal is detected when said second element is enabled.

9. A touch panel as set forth in claim 8, wherein said component failure detection means includes means for displaying a message on said display surface requesting the user to prevent any objects from touching said display surface.

10. A method of locating the position of an object adjacent to a display surface having a defined perimeter, the steps of the method comprising:
providing a multiplicity of light emitting elements and light receiving elements; said elements located so that the light paths defined by selected pairs of light emitting and light receiving elements cross said display surface and define a grid of intersecting light paths thereon;
sequentially energizing selected pairs of said light emitting and light receiving elements so as to repetitively scan said display surface;
generating blocked path signals when the light received by a selected light receiving elements corresponds to a blocked light path;
comparing said path blockage signals with predefined criteria which distinguish between a deliberate touching of said display surface and false or accidental touching of said display surface; and
generating an output signal indicative of the location of said object when said path blockage signals meet said predefined criteria.

11. A method as set forth in claim 10, said comparing step including the step of comparing said path blockage signals from a plurality of scans of said display surface with predefined size and time duration criteria.

12. A method as set forth in claim 10, said comparing step including the step of comparing said path blockage signals from a plurality of scans of said display surface with one or more criteria selected from the set consisting of: a minimum size criteria, a maximum criteria, and a minimum tim duration criteria.

13. A method as set forth in claim 10, further including the step of testing the operability of a selected one of said elements by performing the steps of:
enabling said selected element and a complementary element across said display surface from said selected element, and testing for the presence of a blocking signal;
enabling the same complementary element and a second element of the same type as said selected element and which is located near said selected element, and testing for the presence of a blocking signal; and
denoting the detection of a component failure if a blocking signal is detected when said selected element is enabled, but no blocking signal is detected when said second element is enabled.

14. A method as set forth in claim 12, further including the step of sequentially testing the operability of all of said elements.

15. A method of locating the position of an object adjacent to a display surface having a defined perimeter, the steps of the method comprising:
providing a multiplicity of light emitting elements and light receiving elements; said elements located so that the light paths defined by selected pairs of light emitting and light receiving elements cross said display surface and define a grid of intersecting light paths thereon;
sequentially energizing selected pairs of said light emitting and light receiving elements so as to repetitively scan said display surface;
generating blocked path signals when the light received by a selected light receiving elements corresponds to a blocked light path;

denoting for each of said pairs of said light emitting and light receiving elements whether said pair of elements is not functioning properly; and determining that an object is touching or adjacent to said display surface when said path blockage signals correspond to intersecting block light paths; said determining step ignoring path blockage signals corresponding to pairs of said light emitting and light receiving elements denoted by said denoting step as not functioning properly; and generating an output signal indicative of the location of an object touching or adjacent to said display surface when said determining step determines that an object is touching or adjacent to said display surface.

* * * * *